(12) United States Patent
Kiyashchenko et al.

(10) Patent No.: US 8,428,880 B2
(45) Date of Patent: Apr. 23, 2013

(54) METHOD OF PROCESSING DATA OBTAINED FROM SEISMIC PROSPECTING

(75) Inventors: Denis Kiyashchenko, Rijswijk (NL); William Alexander Mulder, Rijswijk (NL)

(73) Assignee: Shell Oil Company, Houston, TX (US)

( * ) Notice: Subject to any disclaimer, the term of this patent is extended or adjusted under 35 U.S.C. 154(b) by 202 days.

(21) Appl. No.: 12/747,031

(22) PCT Filed: Dec. 12, 2008

(86) PCT No.: PCT/EP2008/067383
§ 371 (c)(1), (2), (4) Date: Jun. 9, 2010

(87) PCT Pub. No.: WO2009/077440
PCT Pub. Date: Jun. 25, 2009

(65) Prior Publication Data
US 2010/0268471 A1 Oct. 21, 2010

(30) Foreign Application Priority Data
Dec. 14, 2007 (EP) .................................. 07123194

(51) Int. Cl.
*G01V 1/00* (2006.01)
(52) U.S. Cl.
USPC ............................................. 702/16; 367/57
(58) Field of Classification Search ............... 702/14, 702/16; 367/32, 57
See application file for complete search history.

(56) References Cited

U.S. PATENT DOCUMENTS

| | | | |
|---|---|---|---|
| 5,148,407 A * | 9/1992 | Haldorsen et al. | 367/32 |
| 5,198,979 A | 3/1993 | Gregg et al. | |
| 5,233,567 A | 8/1993 | Calvert | |
| 6,076,045 A | 6/2000 | Naville | 702/10 |
| 6,510,105 B1 | 1/2003 | ten Kroode | |
| 6,715,551 B2 | 4/2004 | Curtis et al. | |
| 7,340,348 B2 * | 3/2008 | Strack et al. | 702/14 |
| 7,791,981 B2 | 9/2010 | Kiyashchenko | |
| 2003/0021184 A1 | 1/2003 | Zhang | 367/14 |
| 2005/0135189 A1 | 6/2005 | Wang | 367/50 |

FOREIGN PATENT DOCUMENTS

| | | |
|---|---|---|
| GB | 2321968 | 8/1998 |
| WO | WO2004067912 | 8/2004 |

OTHER PUBLICATIONS

Anning Hou et al: "Multicomponent prestack depth migration by scalar wavefield extrapolation". Geophysics Soc. Exploration Geophysicists USA, vol. 67, No. 6, Nov. 2002, pp. 1886-1894, XP0022483442, ISSN: 0016-8033, the whole document.

D. Bevc and B. Biondi, "Which depth imaging method should you use? A road map through the maze of possibilities" The Leading Edge, Jun. 2005, pp. 602-606.

* cited by examiner

*Primary Examiner* — Bryan Bui

(57) ABSTRACT

A method of processing data obtained from seismic prospecting of an earth formation, comprises obtaining data representing a multicomponent seismic signal from a multicomponent seismic receiver at a receiver location in an earth formation, in response to transmitting seismic waves into the earth formation; performing a wave-equation migration of the multicomponent seismic signal to obtain a seismic image of the earth formation, wherein the polarization of the seismic wave at the receiver location is taken into account and wherein a seismic image value at a point in the earth formation is calculated from a sum of products of a source field component for a particular dimension and a complex conjugated back propagated wave field component for the same dimension, summed over a plurality of dimensions.

6 Claims, 2 Drawing Sheets

METHOD OF PROCESSING DATA OBTAINED FROM SEISMIC PROSPECTING

PRIORITY CLAIM

The present application claims priority to PCT Application EP2008/067383, filed 12 Dec. 2008, which claims priority to European Patent Application No. EP 07123194.8, filed 14 Dec. 2007, are incorporated herein by reference.

FIELD OF THE INVENTION

The present invention relates to a method of processing data obtained from seismic prospecting of an earth formation.

BACKGROUND OF THE INVENTION

In processing seismic data obtained from a particular arrangement of seismic source(s) and receiver(s), one of the commonly performed operations to construct an image of the subsurface from the data is called migration. In data migration, reflection events in the seismic data, in particular in time-domain seismic data records, are moved to their correct locations in the seismic image space, which is typically a three-dimensional space (x-y-z or x-y-time) representing a volume of the subsurface, wherein use is made of prior knowledge of the distribution of seismic wave velocity in the subsurface. So, migration is a method of mapping the data from the seismic data domain to the image domain. Migration is an important tool in seismic interpretation for displaying the locations of geological interfaces (events) in the subsurface. Still, migration methods themselves create some degree of noise and/or image distortion or spurious events, such as so-called migration smiles. The latter is particularly pronounced when processing Vertical Seismic Profiling (VSP) data, measured with seismic receivers in a well penetrating the subsurface and seismic sources at or near the surface. In many situations, the migration smiles are suppressed in the final subsurface image after stacking (adding) all the images over sources and/or receivers.

However, in some surveys such as VSP surveys, the number of source-receiver pairs is often too small to suppress all artifacts in the image.

A particularly popular method of performing seismic data migration, because of its computational efficiency, is referred to as Kirchhoff migration. Kirchhoff migration sums values taken from all seismic traces at the total travel time from the source to an image point and from that image point to the receiver (so-called diffracted wave travel time).

In USA patent application publication No. 2005/0135189 A1 is disclosed a method for Kirchhoff migration of seismic data, wherein the full three components of the reflection wavefield are utilized in a dynamic, vector energy mapping method, in order to reduce unwanted data smearing and false mirror images. To this end, for a source-receiver pair and an image point a single ray-path is considered, and a scalar product of the reflection wavefield vector at the recording time and the unit ray vector at the receiver is used as the migration operator. A weighed summation of the migration operators provides a migrated image point.

Another type of seismic data migration is referred to as wave-equation migration. As is pointed out in the paper "Which depth imaging method should you use? A road map through the maze of possibilities" by D. Bevc and B. Biondi, The Leading Edge, June 2005, pp. 602-606, wave-equation migration has certain advantages over Kirchhoff migration, but is much more demanding in terms of computer power. Wave-equation migration treats seismic waves as the solution of the wave equation, thereby allowing for taking more complex phenomena into account than ray tracing.

Spurious events are a serious problem for image interpretation, in particular in sub-salt geological environments. Due to the high seismic velocity contrast, salt bodies may scatter or focus seismic energy like a lens, thereby reducing the number of source-receiver pairs that contribute to the image of the true reflectors after migration. Kirchhoff migration methods considering a single ray path between each source/receiver pair have shortcomings in this situation. For example, the method known from US 2005/0135189 A1 requires a single unit ray vector at the receiver. However there would be several such vectors in the case of multi-pathing of seismic wave energy, which is typical for a sub-salt environment, and it would not be clear which ray path is to be taken.

UK patent application GB 2321968 discloses a method of processing data obtained from seismic prospecting of an earth formation comprising obtaining data representing a multicomponent seismic signal from a multicomponent seismic receiver at a receiver location in an earth formation, in response to transmitting seismic waves into the earth formation, and performing a migration, based on the Kirchhoff transformation (ray tracing), of the multicomponent seismic signal to obtain a seismic image of the earth formation, wherein the polarization of the seismic wave at the receiver location is taken into account.

The method according to the preamble of claim 1 is known from International patent application WO 2004/067912.

There is a need for a seismic data migration method that operates well in a complex situation where points in the subsurface can be connected by multiple ray paths (i.e. multi-pathing) and/or in when diffraction (forward scattering) of seismic waves occurs, such as in subsalt, and where spurious events such as migration smiles can be suppressed.

SUMMARY OF THE INVENTION

A method of processing data obtained from seismic prospecting of an earth formation, comprising the steps of
  obtaining data representing a multicomponent seismic signal from a multicomponent seismic receiver at a receiver location in an earth formation, in response to transmitting seismic waves into the earth formation;
  performing a wave-equation migration of the multicomponent seismic signal to obtain a seismic image of the earth formation, wherein the polarization of the seismic wave at the receiver location is taken into account; characterized in:
  that the step of performing a wave-equation migration comprises:
  a) obtaining a velocity model of the earth formation;
  b) determining, using the velocity model, a wave field generated by a dipole source at the receiver location, for a plurality of orientations of the dipole source, to obtain a plurality of source field components;
  c) determining, using the velocity model and the multicomponent seismic signal, a plurality of back-propagated wave field components; and
  d) obtaining the seismic image from the multidimensional source field and the plurality of back-propagated wave field components;
  that the multidimensional source field components and the multidimensional back-propagated wave field components relate to particular dimensions; and
  that the seismic image value at a point in the earth formation is calculated from a sum of products of the source field component for a particular dimension and the complex conjugated back propagated wave field component for the same dimension, summed over a plurality of dimensions.

The invention is based on the insight gained by Applicant that spurious events such as migration smiles can be minimized in wave-equation migration, when discrepancies between the ray propagation direction and the wave polarization vector are taken into account at the image level. At the image points for which the wave originating from there is polarized in the same direction in which it propagates, the amplitude of the image will be maximal, and these points correspond to true reflector positions. Wave-equation imaging at the same time takes naturally account of multi-pathing and other complex wave propagation phenomena such as diffraction or forward scattering.

DETAILED DESCRIPTION OF THE INVENTION

Today's seismic acquisition technologies allow multicomponent data measurements on land (e.g. so-called surface multicomponent seismic), in boreholes (e.g. Vertical Seismic Profiling), and on the ocean bottom (e.g. by Ocean Bottom Cable, "OBC"). Multicomponent seismic data are acquired by using more than one geophone or accelerometer. For example, three-component seismic data is obtained using three typically orthogonally oriented geophones or accelerometers. Development of multicomponent data imaging methods is of particular importance in borehole seismics. Here, the acquisition aperture is very small, creating noisy images which are difficult to interpret. Therefore, it is important to make the best use of information available in the different data components.

Migration of seismic data generated by a single source and recorded by one receiver maps the measured energy to all subsurface locations where the energy could have been reflected. As a result, the true position of the reflector is uncertain.

Summation of the contributions from all sources and receivers in the survey considerably reduces the uncertainty, because the energy is summed up coherently only at the true reflector positions. However, in VSP surveys the number of source-receiver pairs is often too small to suppress all artifacts in the image. Spurious events are a serious problem for VSP image interpretation, in particular in sub-salt geological environments. Due to the high seismic velocity contrast, salt bodies may scatter or focus seismic energy, thereby reducing the number of source-receiver pairs that contribute to the image of true reflectors after migration.

The invention will now be illustrated by way of example with reference to the drawings, wherein.

Like reference numerals in different Figures denote the same or similar objects.

Figure 1:
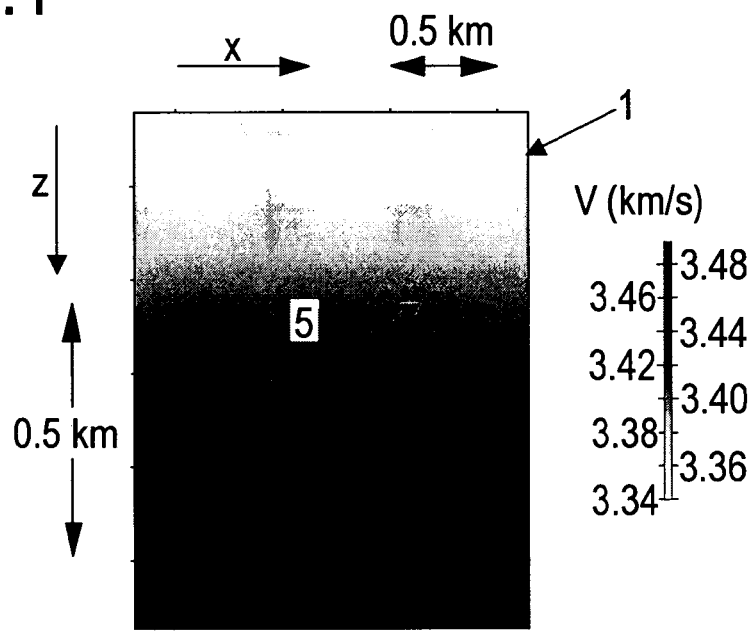
FIG. 1 shows a velocity model for a subsurface region, used for migration.

For acquiring Vertical Seismic Profiling (VSP) data, multicomponent receivers are typically deployed in a well penetrating the subsurface, and at least one, but typically a plurality of sources are activated on surface. The receivers register vibrations in two or three orthogonal directions (such as X, Y, Z).

The signal at a receiver position $\underline{x}_r$ due to the source at position $\underline{x}_s$ as a function of time t is denoted as $u(\underline{x}_r,\underline{x}_s,t)$, and has a plurality of components. (The underscore is being used herein to denote a vector.) The components can be denoted as $u_{isr}(t)$, where s is an index identifying the source, running from 1 to the number of sources $N_s$, r is an index identifying the receiver running from 1 to the number of receivers $N_r$, and i is an index designating the component such as x, y, or z. A signal or wave field can be transformed between the time domain and the frequency domain via Fourier Transformation, frequency is denoted by the symbol ω.

Typically for VSP and OBC configurations, $N_s$ is larger than $N_r$. The raw data are generally obtained by shot from the various sources. It is useful to arrange and store the data in a common receiver gather, so as to obtain for each receiver a data set of the signals originating from the various sources, for each of the receiver components.

It is moreover useful to exchange the roles of sources and receivers, which is possible in view of the reciprocity of seismic signals. For VSP, this is known as a Reverse VSP (RVSP) configuration, in which sources are considered to be in the borehole (at the positions of the 'real receivers' $\underline{x}_r$) and receivers on surface (at the position of the 'real sources' $\underline{x}_s$).

Wave-equation migration (see e.g. Claerbout, J. F., 1971, Toward a unified theory of reflector mapping: Geophysics, 36, p. 467-481.) can in broad lines be characterized by including the following three elements: (i) modelling of the wave field produced by a seismic source (source field), (ii) calculation of a back-propagated ("redatumed") wave field into the medium from the receivers (back-propagation calculates the wave field in the medium by using the measured values of the field on the boundary of the medium; the back-propagated field is an estimate of the signal as it would be measured by a receiver in the medium, and (iii) cross-correlation of the source field with the back-propagated field to construct the subsurface image.

In conventional wave-equation migration, using only the z-component of RVSP seismic data, the common-receiver image $I(\underline{x},\underline{x}_r)$ at a point x is obtained as follows:

$$I_z(\underline{x}, \underline{x}_r) = \int_{\omega_{min}}^{\omega_{max}} s(\underline{x}, \underline{x}_r, \omega) u_{bz}^*(\underline{x}, \underline{x}_r, \omega) d\omega \qquad (1)$$

where s is the source field generated at x by a point impulse source at the location $\underline{x}_r$, and $u^*_{bz}$ is the complex-conjugate of the back-propagated (redatumed) surface data at x.

According to the present invention, a multicomponent signal is processed and the polarization direction of the seismic wave at the (real) receiver location $\underline{x}_r$ is taken into account. For compressional waves, the polarization direction coincides with the actual wave propagation direction of the wave. The method of the present invention migrates the compressional wave components of the signal, any non-compressional wave contributions are supposed to be suppressed so that they do not show up in the result. For the back propagation and the source field calculations a velocity model is used as input. A velocity model provides values of the seismic velocity throughout the considered volume. To use the method of the present invention it is only necessary to know the P-wave velocity. The calculation of the back-propagated field from the recorded seismic data can be done using known wave-equation solving algorithms. For the full two-way wave-equation migration in three dimensions, wherein the up- and downgoing waves are considered, the wave equation $$\frac{\partial^2 u_{bj}(\underline{x}, \underline{x}_r, \omega)}{\partial x^2} + \frac{\partial^2 u_{bj}(\underline{x}, \underline{x}_r, \omega)}{\partial y^2} + \quad (2)$$

$$\frac{\partial^2 u_{bj}(\underline{x}, \underline{x}_r, \omega)}{\partial z^2} + + k^2 u_{bj}(\underline{x}, \underline{x}_r, \omega) = \sum_{\underline{x}_s} \delta(x - x_S) u_j(\underline{x}_S, \underline{x}_r, \omega)$$

is solved for each data component $u_j(\underline{x}_s,\underline{x}_r,\omega)$ (j=1,2,3 or x,y,z), to obtain the back-propagated wavefield components $u_{bj}(\underline{x},\underline{x}_r,\omega)$ for a source at $\underline{x}_r$ (in RSVP configuration). This is repeated for all sources and frequencies. Often, a one-way migration approximately considering only the down-going component is sufficient, and in this case the one-way wave equation is solved with the boundary condition $u_{bj}(\underline{x}_s, \underline{x}_r,\omega)=u_j(\underline{x}_s,\underline{x}_r,\omega)$. Sometimes it is sufficient to only calculate the back-propagated wavefields from two data components.

The propagation direction of a wave originating at image point $\underline{x}$ and registered at receiver $\underline{x}_r$ is efficiently taken into account by calculating a multicomponent source field, i.e. a wave field generated by a dipole source at the receiver location, for a plurality of orientations of the dipole source along various dimensions such as the x, y, or z dimension. An x-dipole source, for example can be thought of as two point impulse sources, each spaced apart a small distance from the nominal source location in either direction along the x-axis, and which sources are triggered at the same time in opposite phase relation to each other. The source field from a dipole source at $\underline{x}_r$ can be represented by a partial derivative of the point source field, for example for an x-dipole source as $$\frac{\partial s(\underline{x}, \underline{x}_r, \omega)}{\partial x_r}.$$

(Note that the partial derivative is taken with respect to $x_r$, which is the x-component of the vector $\underline{x}_r$.)

Then in a high-frequency approximation and single ray path case the derivative is proportional to point source field $s(\underline{x},\underline{x}_r,\omega)$ multiplied by the x-component of the direction of propagation of wave with the origin at the point $\underline{x}$. In the case of multi-pathing the gradient of $s(\underline{x},\underline{x}_r,\omega)$ over the receiver coordinate will be proportional to the sum of scalar wave fields propagating along different paths multiplied by corresponding propagation directions (at the true receiver location).

In two-way migration the following wave equation is solved to calculate the point source field:

$$\frac{\partial^2 s(\underline{x}, \underline{x}_r, \omega)}{\partial x^2} + \frac{\partial^2 s(\underline{x}, \underline{x}_r, \omega)}{\partial y^2} + \frac{\partial^2 s(\underline{x}, \underline{x}_r, \omega)}{\partial z^2} + + k^2 s(\underline{x}, \underline{x}_r, \omega) = \quad (3)$$

$$\delta(x - x_r) f(\omega),$$

where $k=\omega/c(\underline{x})$, $c(\underline{x})$ is the acoustic wave velocity, and $f(\omega)$ is the source wavelet.

The wave field $s(\underline{x},\underline{x}_r,\omega)$ can be determined by a finite-difference scheme in the time domain or the frequency domain. For one-way migration the one way-wave equation $$\frac{\partial s}{\partial z} = i\Lambda_a u \quad (4)$$

can be solved, with $$s(x, y, z = z_r) = \frac{1}{2i\Lambda_a} \delta(x - x_r) f(\omega),$$

and $\Lambda_a$ being an approximation of the square root operator $$\sqrt{k^2 + \frac{\partial^2}{\partial x^2} + \frac{\partial^2}{\partial y^2} + \frac{\partial^2}{\partial z^2}}$$

(see D. Ristow and T. Ruhl, 3-D implicit finite-difference migration by multiway splitting, Geophysics, March 2007, pp. 554-567).

For one source-receiver pair, at a particular subsurface point the vector composed of back-propagated x-component, y-component and z-component fields, will be proportional to the polarization of the wave at the receiver position.

The polarization direction at the location or the real receiver can be suitably taken into account by calculating the image value at a point $\underline{x}$ from a sum of products of the source field component for a particular dimension (dipole orientation) and the complex conjugated result of the back propagation of the corresponding data component, summed over all the components.

For example, if two dimensions x and z are considered, a vector image value $I_v(\underline{x})$ can be calculated as follows:

$$I_v(\underline{x}) = \sum_{\underline{x}_r} \int_{\omega_{min}}^{\omega_{max}} \left[ \frac{\partial s(\underline{x}, \underline{x}_r, \omega)}{\partial x_r} u_{bx}^*(\underline{x}, \underline{x}_r, \omega) + \frac{\partial s(\underline{x}, \underline{x}_r, \omega)}{\partial z_r} u_{bz}^*(\underline{x}, \underline{x}_r, \omega) \right] d\omega \quad (5)$$

$u^*_{bx}$ and $u^*_{bz}$ are the complex-conjugated x- and z-components of the back-propagated wavefield. An integration over all relevant frequencies and a summation is over all sources (in RVSP configuration) at $\underline{x}_r$ are carried out.

In three dimensions, analogously the further product for the y-dimension would be added to the expression in square brackets:

$$\frac{\partial s(\underline{x}, \underline{x}_r, \omega)}{\partial y_r} u_{by}^*(\underline{x}, \underline{x}_r, \omega) \quad (6)$$

The expression in square brackets can be considered as a scalar product of the source-field components and the polarization direction of the seismic wave at the location of the real receiver. The contribution to an image point from each source-receiver pair will be weighted by the scalar product of data polarization vector and wave propagation direction vector at the receiver point. For the true image, the respective directions coincide.

Therefore, with the scalar product the amplitude of the image of the true reflectors will be maximal (the amplitude of the image of false reflectors will be small).

In the case of multi-pathing, when several wave propagation directions correspond to a receiver point, summing the products of wave fields over frequencies automatically selects the correct wave propagation path which makes the main contribution to the value of vector image at each particular point.

In the case of a number of source-receiver pairs, the contributions from all pairs is summed up. The contribution from all surface receivers (in RVSP configuration) is taken into account with the back-propagation operation (since the data from all receivers are back-propagated simultaneously). If there is a number of sources in the well (in RVSP configuration, corresponding to actual VSP borehole receivers), the images build from each of them are summed up.

It has moreover been found that it can be very useful to calculate a noise image from a difference (rather than a sum) of products of the source field component for a particular dimension and the complex conjugated back propagated wave field component computed from different component data. For the two-dimensional case considered above for the x- and z-direction, such a noise image can be calculated as $$I_N(\underline{x}) = \sum_{\underline{x}_r} \int_{\omega_{min}}^{\omega_{max}} \left[ \frac{\partial s(\underline{x}, \underline{x}_r, \omega)}{\partial x_r} u^*_{bz}(\underline{x}, \underline{x}_r, \omega) - \frac{\partial s(\underline{x}, \underline{x}_r, \omega)}{\partial z_r} u^*_{bx}(\underline{x}, \underline{x}_r, \omega) \right] d\omega \quad (7)$$

For the three-dimensional case, three noise image components can be calculated as follows.

$$I_{N3D1}(\underline{x}) = \sum_{\underline{x}_r} \int_{\omega_{min}}^{\omega_{max}} \left[ \frac{\partial s(\underline{x}, \underline{x}_r, \omega)}{\partial y_r} u^*_{bz}(\underline{x}, \underline{x}_r, \omega) - \frac{\partial s(\underline{x}, \underline{x}_r, \omega)}{\partial z_r} u^*_{by}(\underline{x}, \underline{x}_r, \omega) \right] d\omega \quad (8)$$

$$I_{N3D2}(\underline{x}) = \sum_{\underline{x}_r} \int_{\omega_{min}}^{\omega_{max}} \left[ \frac{\partial s(\underline{x}, \underline{x}_r, \omega)}{\partial z_r} u^*_{bx}(\underline{x}, \underline{x}_r, \omega) - \frac{\partial s(\underline{x}, \underline{x}_r, \omega)}{\partial x_r} u^*_{bz}(\underline{x}, \underline{x}_r, \omega) \right] d\omega \quad (9)$$

$$I_{N3D3}(\underline{x}) = \sum_{\underline{x}_r} \int_{\omega_{min}}^{\omega_{max}} \left[ \frac{\partial s(\underline{x}, \underline{x}_r, \omega)}{\partial x_r} u^*_{by}(\underline{x}, \underline{x}_r, \omega) - \frac{\partial s(\underline{x}, \underline{x}_r, \omega)}{\partial y_r} u^*_{bx}(\underline{x}, \underline{x}_r, \omega) \right] d\omega \quad (10)$$

At the correct image locations, the noise image components should ideally be zero. At incorrect image locations, the three noise image components are suitably jointly analysed. The noise images show the noise impact to the image, and it helps to distinguish the true reflection events from the migration noise in the image.

In the case of multi-pathing, an automatic selection of the correct branch of a multi-valued wave-field occurs. This is an important advantage over Kirchhoff migration methods.

The method of the invention may naturally suppress the impact of shear waves in the image if their ray-paths do not differ much from the compressional wave ray-paths. In this case the polarization of shear wave is almost orthogonal to ray propagation directions, while the present method of vector imaging favours waves with polarization parallel to it. Then, the largest part of S-wave energy will be suppressed. However, in inhomogeneous media the ray paths of PP, PS, and SS waves may be considerably different, and in this case it may be beneficial to perform P and S-wave separation prior to migration.

Figure 2:
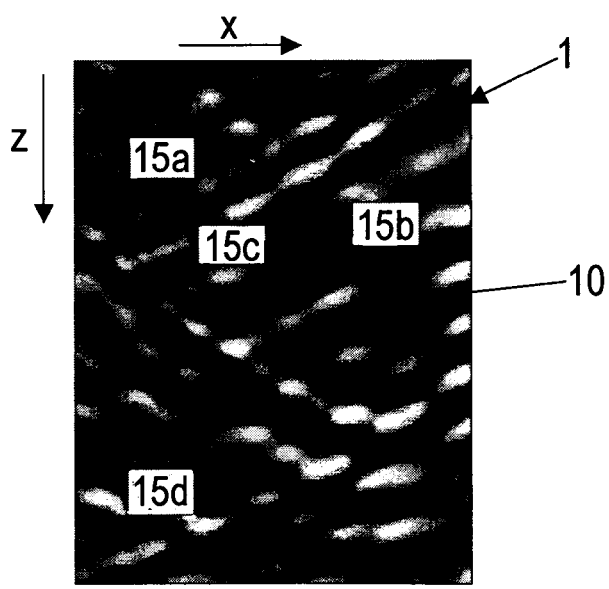
FIG. 2 shows an image of the same subsurface region, obtained according to the present invention.
Figure 3:
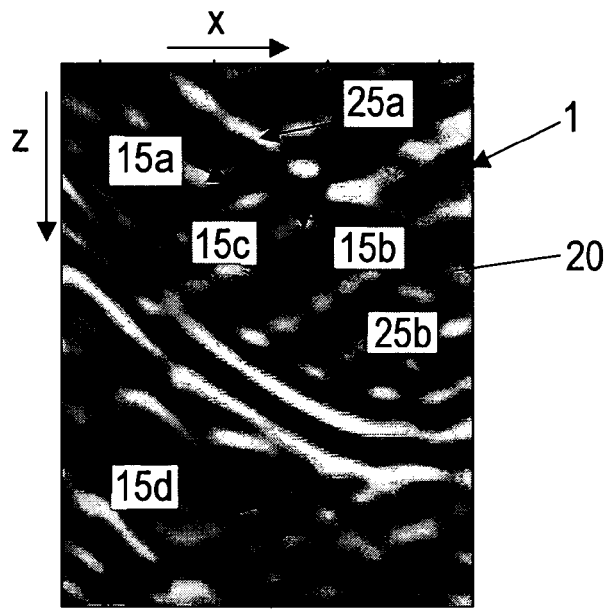
FIG. 3 shows an image of the same subsurface region, not obtained according to the present invention.
Figure 4:
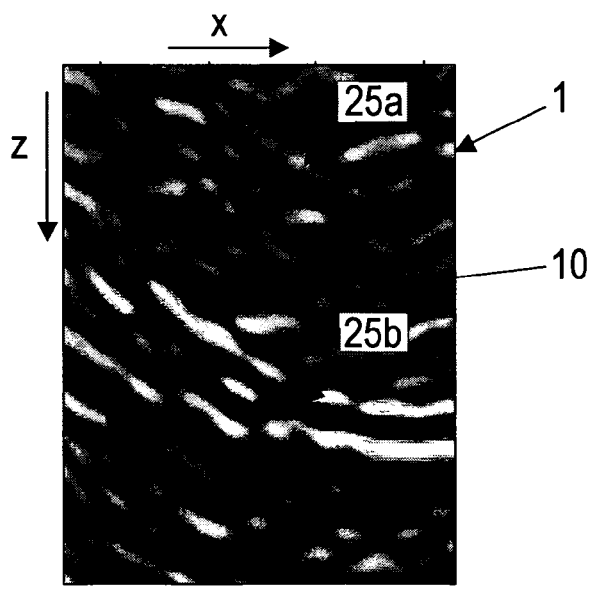
FIG. 4 show a noise image of the same subsurface region, obtained according to the present invention.

The invention will now be illustrated by way of example with reference to the drawings, wherein FIG. 1 shows a velocity model for a subsurface region, used for migration;

FIG. 2 shows an image of the same subsurface region, obtained according to the present invention;

FIG. 3 shows an image of the same subsurface region, not obtained according to the present invention; and FIG. 4 show a noise image of the same subsurface region, obtained according to the present invention.

Like reference numerals in different Figures denote the same or similar objects.

EXAMPLE

From an existing model of a subsurface earth formation including a body of salt, synthetic VSP seismic data were obtained. The data represent 300 sources arranged along a horizontal line at surface, and 100 receivers arranged along a vertical line in the body of salt.

For each component x,y,z of the multicomponent seismic signal the data was sorted into a common-receiver gather. The roles of sources and receivers were exchanged at this point.

A simplified velocity model shown in FIG. 1 was used for migration. The model assumes a downwardly increasing velocity in a two-dimensional (x,z) region of interest 1. The simplified velocity model represents a smoothed version of the full model, having the same average velocity, wherein in the full model a plurality of events are present in the region 1, which are up-curving from left to right in FIG. 1, substantially along the direction of the arrow 5.

The velocity v given in the gray scale bar is in km/s.

The migrated vector image was obtained on the basis of equation 5. This image 10 of the selected sub-salt region 1 is shown in FIG. 2. Clearly, events 15a,b,c,d up-dipping in the direction of the arrow 5 in FIG. 1 can be identified, which represent true reflectors.

Comparative Example 1

The regular z-component image of the selected sub-salt region 1 was calculated on the basis of equation 1. This image 20 is shown in FIG. 3.

The events 15a,b,c,d dipping up from left to right in the image 20 and correspond to the true reflectors are also visible. However, the image is strongly contaminated by migration noise visible as migration smiles 25a, 25b. These appear to be events with strong amplitude, dipping down from left to right. If the image according to the invention was not available, and/or the prior knowledge about the dipping direction in the model from which the synthetic VSP data was calculated, the identification of the events 25a,b as migration noise would not have been possible.

In FIG. 2, the amplitude of the migration smiles 25b is considerably reduced in comparison with FIG. 3. The image of the true dipping reflectors appears to be more continuous.

Comparative Example 2

The noise image 40 corresponding to FIG. 2 and calculated on the basis of equation (7) is shown in FIG. 4. The migration smiles 25a,b are visible again and this confirms that they are noise. The true events 15a,b,c,d are not present in this image. FIGS. 2 and 4 together allow to interpret even more clearly what is a true reflector and what is noise in the image.

The invention claimed is:

1. A method of processing data obtained from seismic prospecting of an earth formation, comprising the steps of:

obtaining data representing a multicomponent seismic signal from a multicomponent seismic receiver at a receiver location in an earth formation, in response to transmitting seismic waves into the earth formation;

performing a wave-equation migration of the multicomponent seismic signal to obtain a seismic image of the earth formation, wherein the polarization of the seismic wave at the receiver location is taken into account;

wherein:

the step of performing a wave-equation migration comprises:
- a) obtaining a velocity model of the earth formation;
- b) determining, using the velocity model, a wave field generated by a dipole source at the receiver location, for a plurality of orientations of the dipole source, to obtain a plurality of source field components;
- c) determining, using the velocity model and the multicomponent seismic signal, a plurality of back-propagated wave field components;
- d) obtaining the seismic image from the multicomponent source field and the plurality of back-propagated wave field components;

the source field components and the back-propagated wave field components each relate to a particular spatial dimension; and the seismic image value at a point in the earth formation is calculated from a sum of products of the source field component for a particular source orientation and the complex conjugated back propagated wave field component for the corresponding spatial dimension, summed over a plurality of spatial dimensions.

2. The method according to claim 1, wherein the seismic data include multicomponent seismic signals from a plurality of multicomponent seismic receivers, and wherein in the calculation of the seismic image value a summation over the receivers is carried out.

3. The method according to claim 1, wherein in the calculation of the seismic image value an integration or summation over a plurality of seismic wave frequencies is carried out.

4. A method of processing data obtained from seismic prospecting of an earth formation, comprising the steps of:

obtaining data representing a multicomponent seismic signal from a multicomponent seismic receiver at a receiver location in an earth formation, in response to transmitting seismic waves into the earth formation;

performing a wave-equation migration of the multicomponent seismic signal to obtain a seismic image of the earth formation, wherein the polarization of the seismic wave at the receiver location is taken into account;

wherein:

the step of performing a wave-equation migration comprises:
- a) obtaining a velocity model of the earth formation;
- b) determining, using the velocity model, a wave field generated by a dipole source at the receiver location, for a plurality of orientations of the dipole source, to obtain a plurality of source field components;
- c) determining, using the velocity model and the multicomponent seismic signal, a plurality of back-propagated wave field components;
- d) obtaining the seismic image from the multicomponent source field and the plurality of back-propagated wave field components;

the source field components and the back-propagated wave field components each relate to particular spatial dimension; and the seismic image value at a point in the earth formation is calculated from a sum of products of the source field component for a particular source orientation and the complex conjugated back propagated wave field component for the corresponding spatial dimension, summed over a plurality of spatial dimensions;

wherein the multidimensional source field and the multidimensional back-propagated wave field both have components in a plurality of spatial dimensions, and wherein a seismic noise image value at a point in the earth formation is calculated from a difference of products, wherein each product is calculated from a source field component and a different complex conjugated back propagated wave field component.

5. The method according to claim 4, wherein the seismic data include multicomponent seismic signals from a plurality of multicomponent seismic receivers, and wherein in the calculation of the seismic image value a summation over the receivers is carried out.

6. The method according to claim 4, wherein in the calculation of the seismic image value an integration or summation over a plurality of seismic wave frequencies is carried out.

* * * * *